(12) United States Patent
Marti et al.

(10) Patent No.: US 9,769,107 B2
(45) Date of Patent: Sep. 19, 2017

(54) LIFESTYLE-BASED SOCIAL GROUPS

(71) Applicant: Apple Inc., Cupertino, CA (US)

(72) Inventors: Lukas M. Marti, Santa Clara, CA (US); Shannon M. Ma, San Francisco, CA (US); Michael P. Dal Santo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 801 days.

(21) Appl. No.: 14/070,341

(22) Filed: Nov. 1, 2013

(65) Prior Publication Data

US 2015/0127728 A1    May 7, 2015

(51) Int. Cl.
*H04L 12/18* (2006.01)
*H04L 12/58* (2006.01)

(52) U.S. Cl.
CPC .................... *H04L 51/32* (2013.01)

(58) Field of Classification Search
CPC ................... H04L 12/1813; H04L 12/5865
USPC .... 709/205, 206, 207, 208; 705/14.4, 14.49, 705/14.58
See application file for complete search history.

(56) References Cited

U.S. PATENT DOCUMENTS

| | | | |
|---|---|---|---|
| 9,076,009 B2 | 7/2015 | Sathish et al. | |
| 9,118,735 B1* | 8/2015 | McInerny | G06Q 50/01 |
| 9,246,708 B2* | 1/2016 | Rao | H04L 12/5865 |
| 2011/0046881 A1 | 2/2011 | Karaoguz | |
| 2011/0173261 A1* | 7/2011 | McCallie, Jr. | G06F 19/322 709/204 |
| 2013/0091209 A1* | 4/2013 | Bennett | G06Q 50/01 709/204 |

OTHER PUBLICATIONS

"An Ad Hoc Mobility Model Founded on Social Network Theory"—Musolesi et al, Dept. of Computer Science, University College London, Jul. 2004 https://www.cl.cam.ac.uk/~cm542/papers/mswim04.pdf.*

* cited by examiner

*Primary Examiner* — Randy Scott
(74) *Attorney, Agent, or Firm* — Fish & Richardson P.C.

(57) ABSTRACT

Techniques for lifestyle-based social groups are described. A user device can learn movement patterns of the user device. Based on the movement pattern, and a user activity history, a computer system can determine a lifestyle of a user, or a meaning of a location. The system can create a social group based on the lifestyle and the meaning of location. The system can designate the lifestyle or meaning as a theme of the social group. The social group can be an ad hoc social network. For example, the social group can be created without an explicit user request, can be anonymous, and can be lifestyle and location based.

30 Claims, 10 Drawing Sheets

LIFESTYLE-BASED SOCIAL GROUPS

TECHNICAL FIELD

This disclosure relates generally to social networking.

BACKGROUND

Today, one of the most popular media for learning about people is online social networks. On a social network website, people can post information about themselves. The information can include, for example, hobbies, pictures, links to favorite websites, and writings about places visited. This information can be harvested to understand a person's interests. However, this information may not be sufficient to determine a person's everyday lifestyle. Typically, a person does not post information useful for determining the person's everyday lifestyle, e.g., the person's work, commute, or other daily routines. People generally do not believe that this information is of interest to an audience in a social network and, as a result, do not blog about this information.

SUMMARY

Techniques for lifestyle-based social groups are described. A user device can learn movement patterns of the user device. Based on the movement pattern, and a user activity history, a computer system can determine a lifestyle of a user, or a meaning of a location. The system can create a social group based on the lifestyle and the meaning of location. The system can designate the lifestyle or meaning as a theme of the social group. The social group can be an ad hoc social network. For example, the social group can be created without an explicit user request, can be anonymous, and can be lifestyle and location based.

The features described in this specification can be implemented to achieve one or more advantages. For example, a user device can learn a user's movement pattern, and provide assistance according to the movement pattern. The user device can provide the assistance based on the movement pattern without requiring additional user input. The user device can predict a user action, anticipating a location and a task at a given time. The user device can then provide the assistance ahead of the given time.

A system (e.g., a user device, a server, or both) implementing lifestyle-based social groups can help people socialize. The system can create ad hoc and anonymous social groups. The social groups can be based on similar activities and interests of members, even if the members do not post the activities and interests on a social networking website. The system can invite a user to join the social group as an anonymous member based on a location of the user and a movement pattern of the user.

Accordingly, a user of the system may have a better experience using services, especially location-based services, of system. For example, a user device can determine that a user usually goes to a place at 5:00 pm on weekdays. Based on various information (e.g., a business name corresponding to the location), the mobile device can determine that the place is a gymnasium. Accordingly, the mobile device can provide exercise related information to the user, or create an ad hoc "gym" social group for the user to join.

The details of one or more implementations of lifestyle learning are set forth in the accompanying drawings and the description below. Other features, aspects, and advantages of lifestyle learning will become apparent from the description, the drawings, and the claims.

BRIEF DESCRIPTION OF THE DRAWINGS

Like reference symbols in the various drawings indicate like elements.

DETAILED DESCRIPTION

Exemplary Ad Hoc Social Groups

Figure 1:
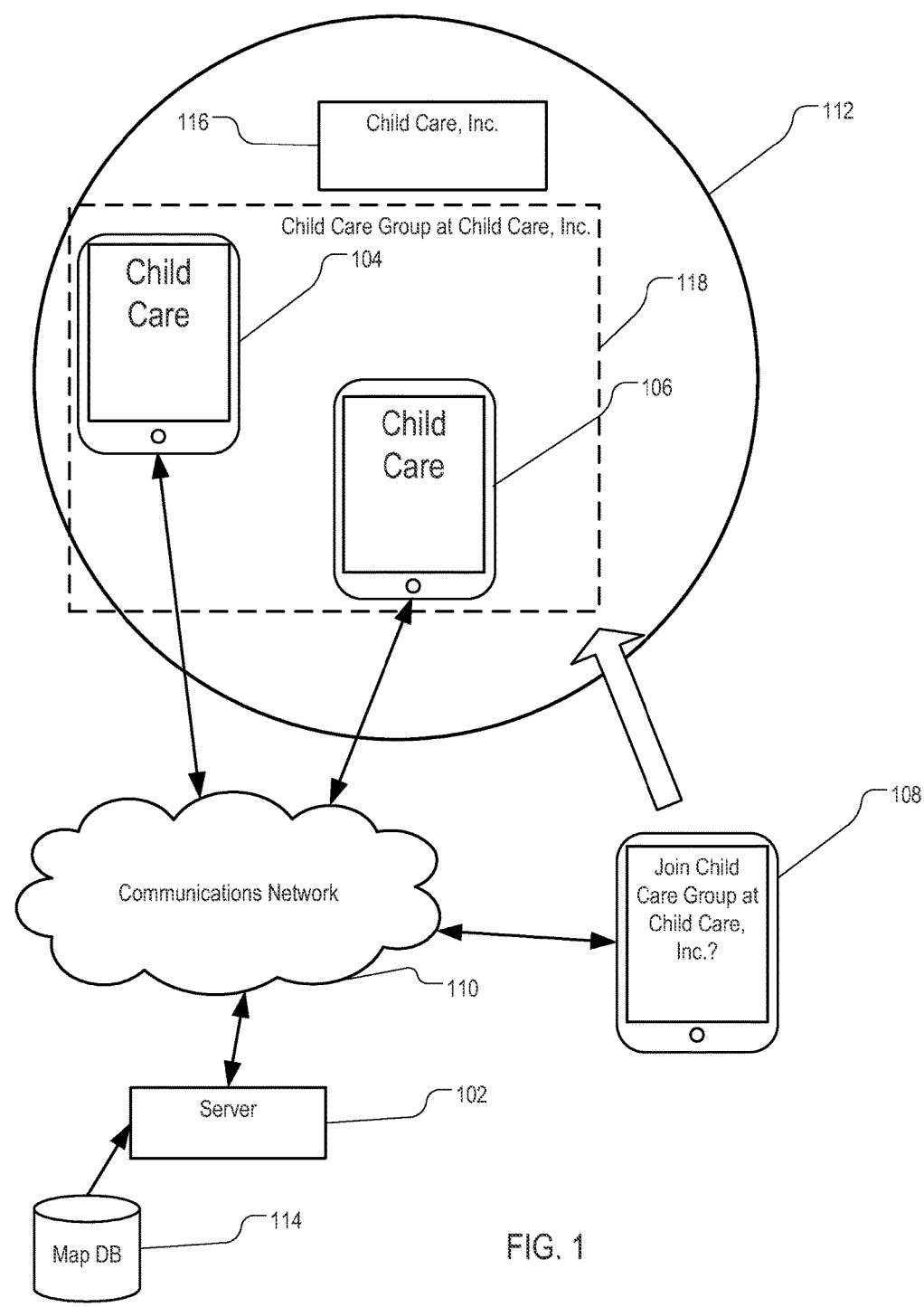
FIG. 1 is a diagram illustrating exemplary techniques of creating an ad hoc social group based on similar lifestyles.

FIG. 1 is a diagram illustrating exemplary techniques of creating an ad hoc social group based on similar lifestyles. Server 102 can be coupled to user devices 104, 106, and 108 by communications network 110. Server 102 can include one or more computers programmed to receive device information from user devices 104, 106, and 108. Each of user devices 104, 106, and 108 can be a mobile device (e.g., a laptop or tablet computer, a smart phone, or a wearable computing device) that can be carried by a person or a vehicle. The device information can include location information and activity information. The location information can include time-based device locations. The activity information can include user activities, including, for example, search history, application launching history, or content playing history.

Server 102 can determine, based on the location information, that user devices 104 and 106 have experiences that are similar to one another in one or more respects. For example, server 102 can determine that both user devices 104 and 106 follow a movement pattern of visiting location 112 at a given time (e.g., between 8:00 am and 9:00 am) repeatedly (e.g., Monday through Friday). Location 112 can be a geographic location defined by latitude, longitude, and altitude coordinates or defined by one or more wireless gateways (e.g., cellular towers, wireless access points, or radio frequency (RF) signal beacons).

Server 102 can determine a meaning of location 112, based on the location information and associated timestamps, based on geographic information from map database 114, or based on the activity information. The meaning of location 112 can be a characteristic of location 112, an activity that people perform at location 112, or content that people are interested in at location 112. For example, server 102 can determine that, according to geographic information from map database 114, business 116 providing childcare service ("Child Care, Inc.") is located at location 112. In addition, server 102 can determine that, according to movement patterns of user device 104 and user device 106, that users of user device 104 and user device 106 visit location 112 with sufficient regularity at a time generally considered as a time just before a start of a workday and a time generally considered as a time just after an end of a workday. Server 102 can determine that this movement pattern is consistent with human behavior of sending children to a day care center in the morning and picking them up after work. Accordingly, server 102 can associate the geographic information and the movement patterns to determine that one possible meaning of location 112 is a childcare service, and lifestyles of the users of user device 104 and user device 106 include visiting the childcare service before and after work.

Server 102 can determine social group 118 based on the possible meaning of location 112 and the lifestyles. Server 102 can associate social group 118 with location 112 and designate the meaning of location 112, in association with the lifestyle, as a theme of social group 118. Server 102 can determine social group 118 without requiring a user to start the social group. Server 102 can determine social group 118 in an ad hoc manner, and invite user to join the social group anonymously based on movement pattern and location. For example, server 102 can determine that user device 108 starts a movement pattern of visiting location 112 at hours similar to those hours in which user devices 104 and 106 visit location 112. Accordingly, server 102 can determine that a user of user device 108 may be interested in joining social group 118. Server 102 can then send an invitation to user device 108, inviting the user of user device 108 to join social group 118.

After determining social group 118, server 102 can allow members of social group 118 to share information, post announcements, and communicate with one another. Compared to a conventional social group, where members typically post information of significant events (e.g., vacations, memorable experiences, or movies), social group 118 can be more utilitarian, relating to people's everyday life. Accordingly, server 102 can provide information that may be helpful in everyday life to social group 118, for example, by posting traffic condition near location 112 during hours in which most people visit location 112 in social group 118.

Figure 2:
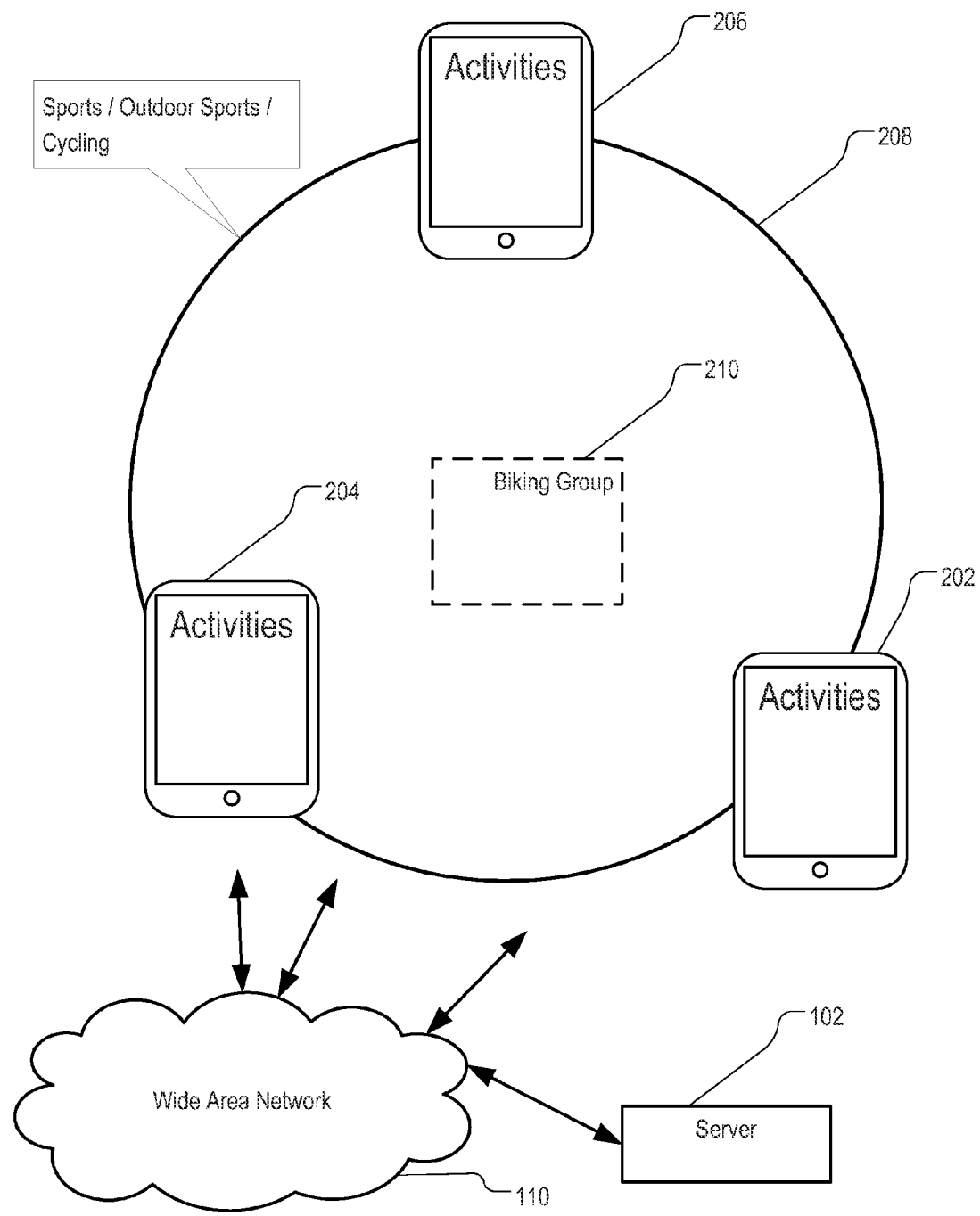
FIG. 2 is a diagram illustrating exemplary techniques of determining a theme of an ad hoc social group based on lifestyles.

FIG. 2 is a diagram illustrating exemplary techniques of determining a theme of an ad hoc social group based on lifestyles. A server (e.g., server 102 of FIG. 1) can determine the lifestyles using movement patterns and user activities. The server can determine a meaning of a geographic location based on the lifestyles.

The server can receive location information and user activity information from user devices 202, 204, and 206. The location information and user activity information are anonymized. Based on the location information, the server can determine that user devices 202, 204, and 206 visit location 208 on a regular basis (e.g., every Sunday afternoon). The server can determine that lifestyles of users of user devices 202, 204, and 206 include regular visits to location 208.

The server can determine additional information of the lifestyles using machine-learning techniques and based on the user activity information. The server can determine the additional information using supervised learning based on a set of one or more profile classes or using unsupervised learning based on clusters. The user activity information can include user activity records (on what a user has done) and sensor records (on what a user device has detected). In both supervised learning and unsupervised learning, the server can determine the additional information using anonymized user activity records in the activity information and anonymized sensor records in the activity information.

The user activity records can include a user's search history, content view history, website visit history, communication history, and application launching history. For example, server 102 can determine that the anonymized user activity records in user activity information from at least one device of user devices 202, 204, and 206 include a user search on bicycle accessories, viewing cycling related videos, visiting sites selling the bicycle accessories, posting cycling announcements on a public cycling forum, or downloading and executing application programs for calculating calorie burning rate of cycling. Server 102 can then determine that at least one user among users of user devices 202, 204, and 206 may have a lifestyle related to a class "sports," a subclass "outdoor sports," and a sub-subclass "bicycles" or "cycling." Server 102 need not know an identity of a user having this lifestyle, or which of 202, 204, and 206 provided the user activity information that led to this determination.

The sensor records can include measurements taken by a manometer, accelerometer, gyroscope, compass, microphone, GPS interface, or other sensors coupled to user devices 202, 204, and 206. Server 102 can determine an environment based on the sensor records, and determine a lifestyle based on the environment and optionally, based on a matching between the environment and a characteristic of location 208. For example, server 102 can determine that, according to at least one of the user devices 202, 204, and 206 at a time of visiting location 208, a noise level determined using measurements from a microphone matches a noise profile associated with an outdoor environment (rather than an indoor environment or an in-vehicle environment). Server 102 can determine that, according to the same user device at the time of visiting location 208, a traveling speed of a user device is X kilometer an hour. Server 102 can determine that the speed (e.g., 30 km/hour) is higher than that of a typical pedestrian or runner, consistent with that of a cyclist, and consistent with that of a motorist. Server 102 can determine that, based on a totality of the environments (e.g., outdoor, cycling or driving) that, at time of visiting location 208, a user device may be traveling on a bicycle or motorcycle.

The server can match the possible lifestyles determined using the anonymous user activity records and the sensor records to determine a general lifestyle of users of user devices 202, 204, and 206. For example, by matching the lifestyle of "outdoor sports, cycling" determined based on user activity records and lifestyle of "outdoor, cycling or driving" determined based on sensor records at time when user devices 202, 204, and 206 are located at location 208, the server can determine that, with a certain likelihood, a lifestyle of a user regularly visiting location 208 is cycling at location 208. The server can make the determination even when the server cannot locate a feature (e.g., a business or bike trail) at or near location 208 that can help determining a meaning of location 208.

Based on the lifestyle, the server can determine ad hoc social group 210. The server can recommend ad hoc social group 210 on user devices corresponding to similar lifestyles. For example, the server can present an invitation for joining ad hoc social group 210 on a user device located at location 208 upon determining that the user device visited location 208 at a given regularity (e.g., at least twice during the hours cyclists gather at location 208), or upon determining that the user device has a sensor reading that matches a cyclist's lifestyle.

Figure 3:
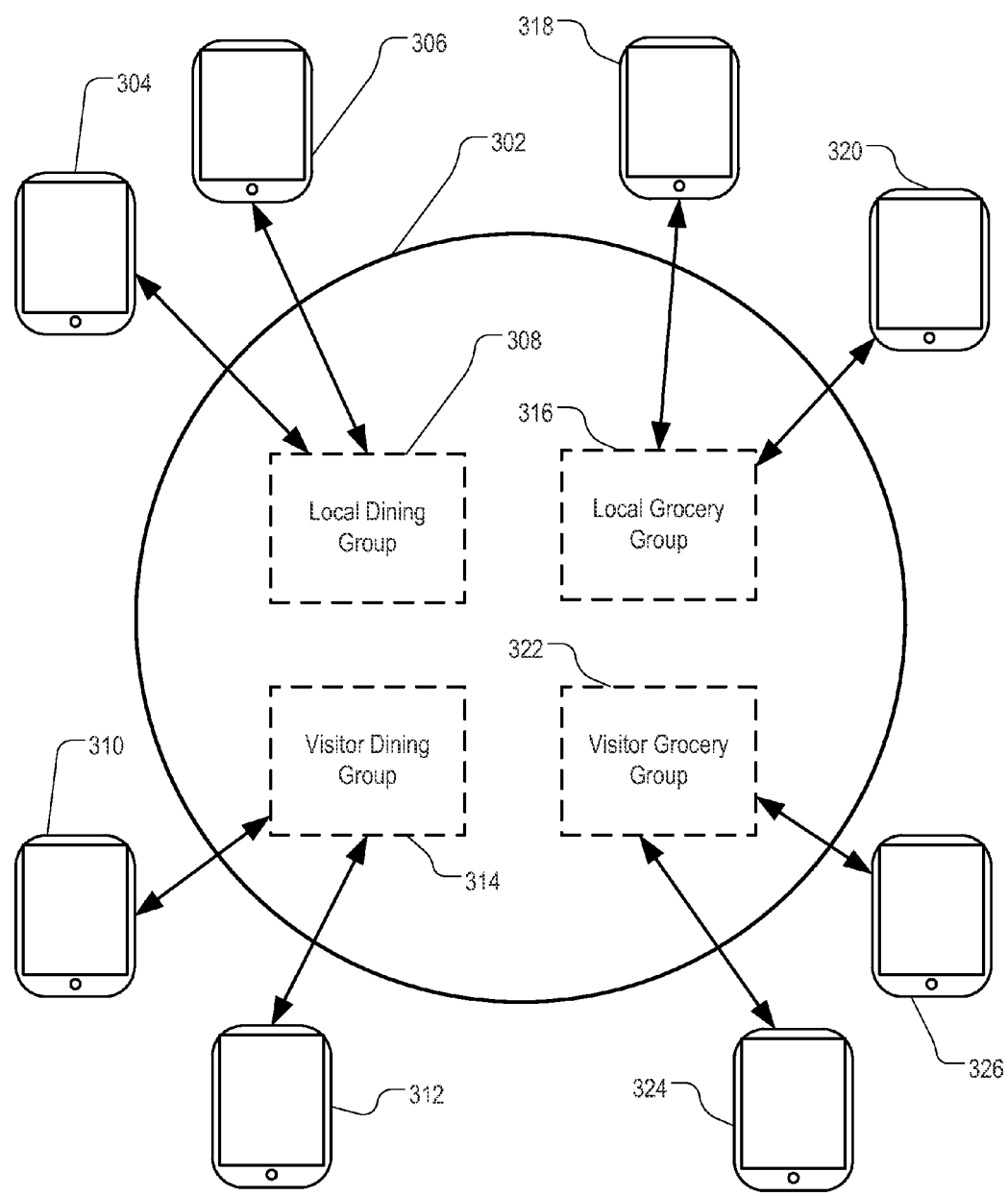
FIG. 3 is a diagram illustrating exemplary techniques of managing ad hoc social groups based on different lifestyles.

FIG. 3 is a diagram illustrating exemplary techniques of managing ad hoc social groups based on different lifestyles. Location 302 can have multiple meanings and can be visited by people having different lifestyles. For example, location 302 can be a shopping mall having various sections (e.g., a dining section and a grocery shopping section), or a city having various districts. Based on analysis of location information and user activity information from multiple user devices, a server (e.g., server 102 of FIG. 1) can create multiple ad hoc social groups associated with location 302, each having a different theme corresponding to a meaning or a lifestyle.

The server can determine that a group of user devices, including user devices 304 and 306, each has a first movement pattern and a first activity pattern at location 302. The server can determine that first movement pattern of user devices 304 and 306 in the group has a commonality. For example, the server can determine that, for a past period of X months, each of user devices 304 and 306 satisfies one or more conditions indicating that a respective user of each of user devices 304 and 306 is a local person who has a lifestyle of remaining at or near location 302 for most of the time. The server can designate these conditions as "locals" condition.

For example, the server can determine that user device 304 satisfies the "locals" conditions upon determining that user device 304 spends a predominant amount (e.g., higher than a threshold of Y percent) of time at locations within a neighborhood of location 302. The server can define the neighborhood using various geographic definitions. For example, the server can define the neighborhood as a city, a postal code area, or a predefined area of Z square miles or square meters that surrounds location 302.

In addition, the server can determine that user device 304 and user device 306 have a common first activity pattern. For example, the server can determine that user device 304 and user device 306 both visit one or more same or different restaurants regularly (e.g., on Saturdays) based on locations of user device 304 and user device 306, addresses of the restaurants, and reviews of the restaurants published in a public forum by user device 304 and user device 306.

Based on the first movement pattern and the common activity pattern, the server can determine ad hoc social group 308 and a theme of social group 308. The server can designate the theme as "dining places for locals." The server can provide for display recommendations on joining social group 308 to user devices located at location 302. For example, the server can provide an invitation to user devices 304 and 306.

The server can determine that a group of user devices, including user devices 310 and 312, each has a second movement pattern and a second activity pattern at location 302. The server can determine that second movement pattern of user devices 310 and 312 in the group has a commonality. For example, the server can determine that, for a past period of X' months, each of user devices 304 and 306 satisfies one or more conditions that indicate that a user of each of user devices 304 and 306 is a visitor who has a lifestyle of staying at a location far away from location 302 for most of the time, and that each user is only visiting location 302 for a short time (e.g., one or two days). The server can designate these conditions as "visitors" conditions. Visitors conditions may or may not be exact opposites to "locals" conditions.

For example, the server can determine that user device 310 satisfies the visitors conditions upon determining that user device 304 spends a predominant amount (e.g., higher than a threshold of Y' percent) of time at locations away from location 302. The server can determine that user device 310 moves between those locations at certain regularity, for example, following a daily, weekly, or monthly pattern. The server can determine that a visit by user device 310 to location 302 is inconsistent with the patterns. The server can determine that the inconsistency may indicate, for example, a user of user device 310 is visiting location 302 on vacation, or was relocated to location 302 a number of days ago.

In addition, the server can determine that user device 310 and user device 312 have a common second activity pattern. For example, the server can determine that user device 310 and user device 312 both visit one or more same or different restaurants based on locations of user device 310 and user device 312, addresses of the restaurants, and reviews of the restaurants published in a public forum by user device 310 and user device 312. The server can determine that the restaurants visited by users of user device 310 and user device 312, probably new-comers or tourists, are different from the restaurants visited by local people.

Based on the second movement pattern and the commonalties among the second activity patterns, the server can determine ad hoc social group 314 and a theme of social group 314. The server can designate the theme as "dining places for visitors." The server can provide for display recommendations on joining social group 314 to user devices at location 302. For example, the server can provide an invitation to user devices 310 and 312.

Likewise, the server can determine ad hoc social group 316 based on movement patterns and activity patterns of user devices 318 and 320. The server can determine a theme of social group 316 upon determining that the movement patterns and activity patterns satisfy the locals conditions, and upon determining that the movement patterns and activity patterns indicating users of user devices 318 and 320 visit one or more grocery stores. Accordingly, the server can designate the theme "grocery stores for locals." The server can determine ad hoc social group 322 based on movement patterns and activity patterns of user devices 324 and 326. The server can determine a theme of social group 322 upon determining that the movement patterns and activity patterns satisfy the visitors conditions, and upon determining that the movement patterns and activity patterns indicating users of user devices 324 and 326 visit one or more grocery stores. Accordingly, the server can designate the theme "grocery stores for visitors."

In some implementations, the server can provide recommendations to join social groups 308, 314, 316, and 322 to any user device located at location 302 and seeking recommendations. Accordingly, the server can provide a visitor or a new corner a choice between a group for visitors, which may include information on restaurants or grocery stores more conveniently located, or a group for locals, which may include information on restaurants or grocery stores that are more authentic to location 302. The server can provide a user interface for making the choice.

In some implementations, the server can provide recommendations to join social groups 308, 314, 316, and 322 to user devices based on filters implemented on the server or on the user devices. For example, the server can implement a pre-specified or user-specified rule of assimilation providing that, once a visitor stayed at location 302 for sufficiently long time (e.g., a threshold of N months), the visitor becomes a local person. The server can implement a filter enforcing this rule by filtering out visitor groups (e.g., social group 314 and social group 322) from recommendations to provided to devices that are associated with the visitors who are now deemed locals.

Figure 4:
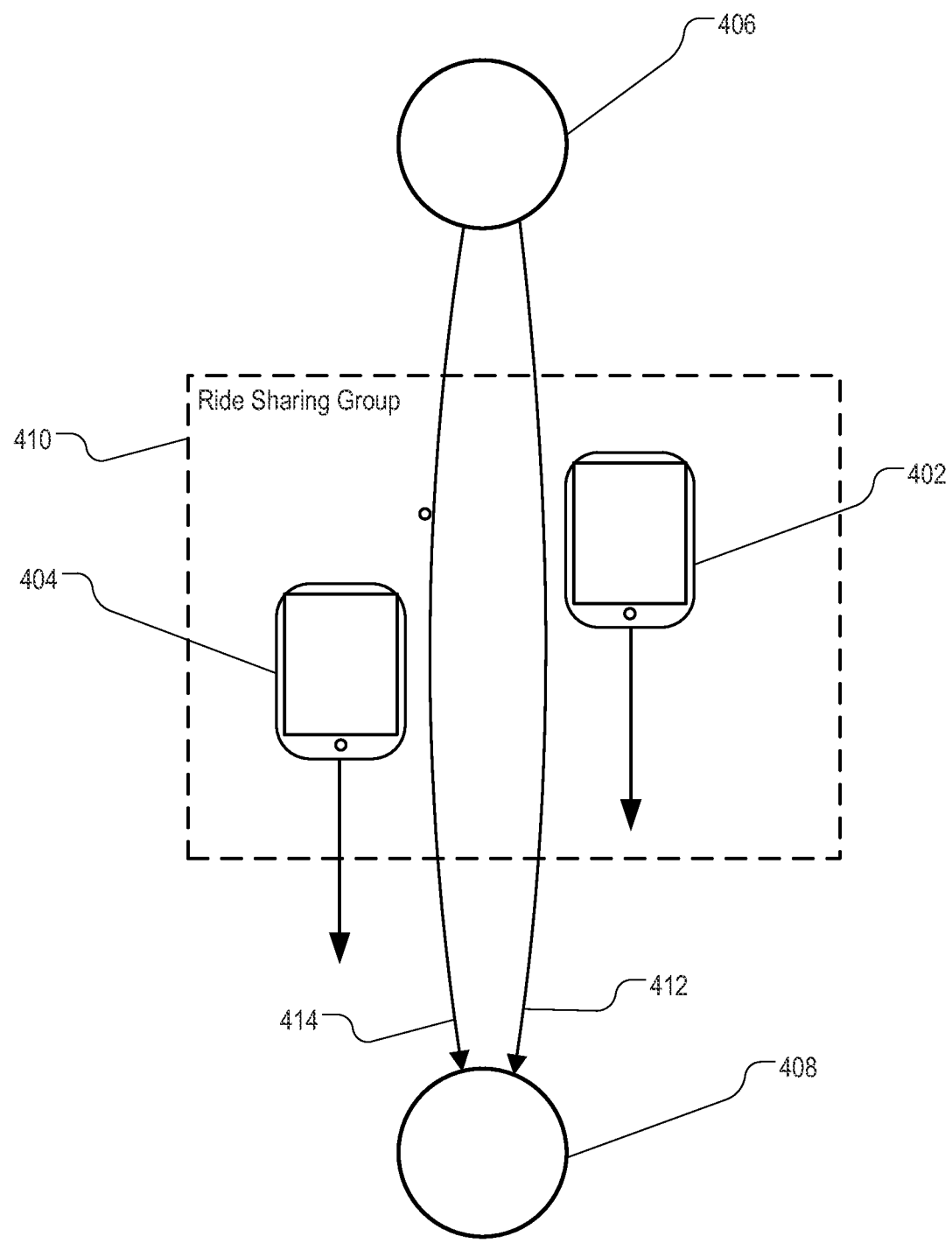
FIG. 4 is a diagram illustrating exemplary techniques of managing ad hoc social groups based on movement patterns.

FIG. 4 is a diagram illustrating exemplary techniques of managing ad hoc social groups based on movement patterns. A server (e.g., server 102 of FIG. 1) can receive location information from user devices 402 and 404. Based on the location information, the server can determine that a movement pattern of user device 404 has a commonality with user device 404. The commonality includes that, with similar regularity, user devices 402 and 404 moves from location 406 to location 408.

For example, the server can determine that, out of M number of weekdays in the past X months, during the hours of 8:00 am and 9:00 am, user device 402 has travelled from location 406 to location 408 on N1 number of weekdays. The server can determine that, out of the M number of weekdays in the past X months, during the hours of 8:00 am and 9:00 am, user device 404 has travelled from location 406 to location 408 on N2 number of weekdays. The server can determine that each of the numbers N1 and N2 satisfies a first threshold value (e.g., N1/M>T1, and N2/M>T1, where T1 is the first threshold value), and that a correlation between N1 and N2 satisfies a second threshold value. The server can determine the correlation based on days on which both user device 402 and user device 404 travelled from location 406 to location 408, where more number of such days indicates a higher correlation.

Upon determining the commonality, the server can determine ad hoc social group 410. The server can determine a theme of social group 410 based on the movement patterns, and designate the theme as "ride sharing" theme. The server can provide ride sharing (e.g., carpooling) information, including a bulletin board where a user can specify where and when the user wish to pick up passengers (or to be picked up) to travel from location 406 to location 408.

In some implementations, the server can determine travel paths 412 and 414 of user devices 402 and 404, respectively, based on location information received from user devices 402 and 404. Paths 412 and 414 may be same or different. Upon determining paths 412 and 414, the server can provide additional information to social group 410 to assist member of social group 410. The additional information can include, for example, a percentage of devices that travel along path 412 compared to a percentage of devices that travel along path 412, traffic conditions at a given time on paths 412 and 414, and a comparison of travel durations along paths 412 and 414. Based on the comparison, the server can provide a recommended path to members of social group 410. For example, the server can determine that, on Mondays, path 412 corresponds to the shortest travel time from location 406 to location 408, and that, on other weekdays, path 414 corresponds to the shortest travel time. Accordingly, the server can provide different recommendations on different days of a week.

Exemplary Device Components

Figure 5:
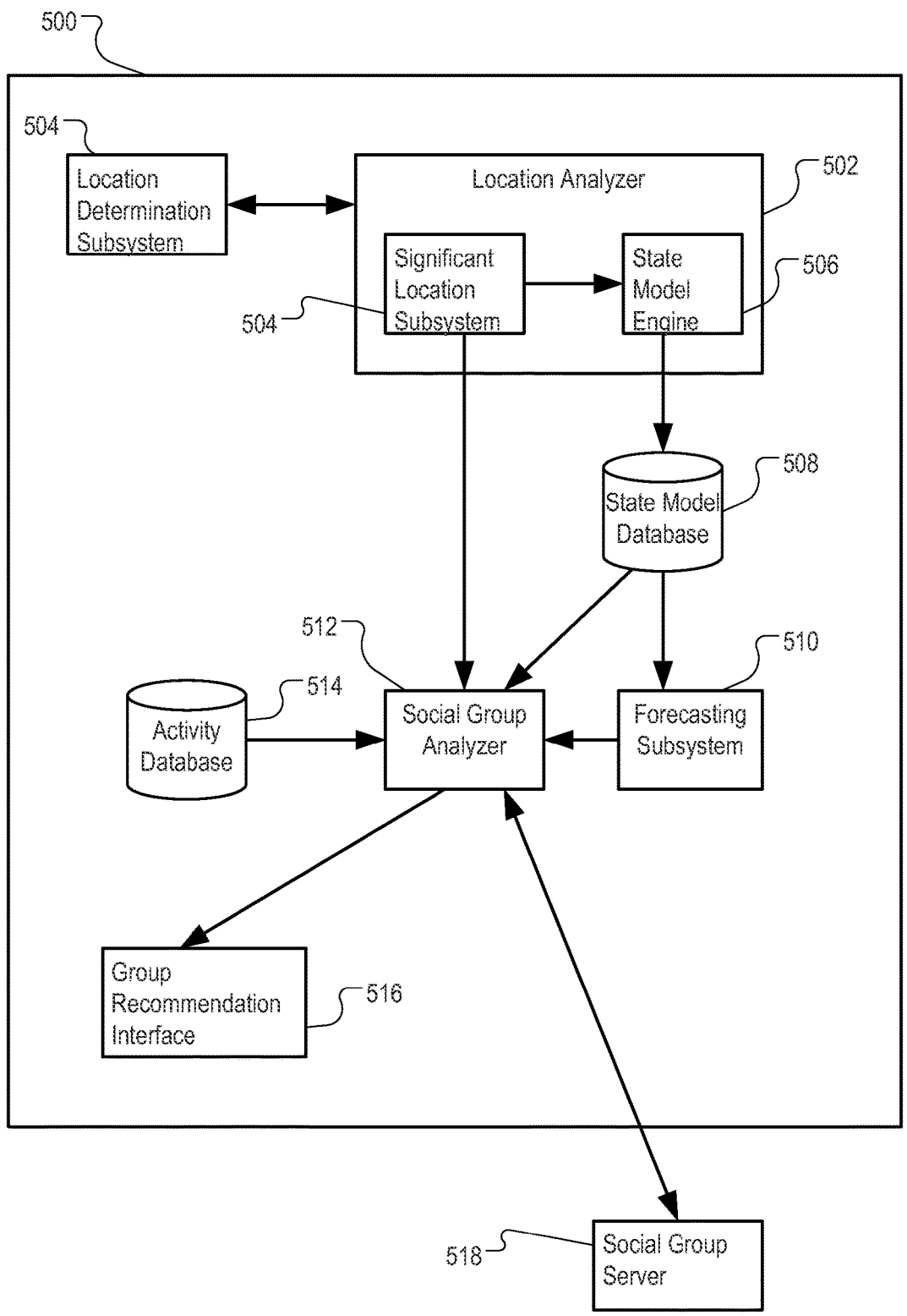
FIG. 5 is a block diagram illustrating exemplary components of a system configured to determine ad hoc social groups based on lifestyle.

FIG. 5 is a block diagram illustrating exemplary components of system 500 configured to determine ad hoc social groups based on lifestyle. System 500 can include server 102 of FIG. 1, one or more user devices, or both. Each component of system 500 can include hardware and software (or firmware) components.

System 500 can include location analyzer 502. Location analyzer 502 can be a component of a user device or a component of server 102 configured to determine a location pattern of the user device based on location data from location determination subsystem 504. The location data can include a series of one or more location readings, each being associated with a timestamp. Location determination subsystem 504 can be a component of a user device or a component of server 102 programmed to determine a location of a user device using a satellite navigation system (e.g., GPS), a cellular communications system (e.g., by triangulation using cellular towers), or wireless access gateways (e.g., by triangulation using known access point locations).

Location analyzer 502 can include significant location subsystem 504 and state model engine 506. Significant location subsystem 504 is a component of location analyzer 502 configured to determine one or more significant locations based on the location data. A significant location is a location that has been determined to be significant to a user of a user device. A significant location can be a frequent location, which is a location that a user device has stayed for a sufficient amount of time (e.g., X minutes) such that significant location subsystem 504 can determine that there is a sufficiently high probability (e.g., above Y percent) that the user device has visited this location. Significant location subsystem 504 can thus filter out outliers and errors (e.g., those caused by poor GPS signal reception). A significant location can be a location referenced by the user. Significant location subsystem 504 can determine that a location is a significant location using one or more data sources, e.g., a user's voice, text, photo, or video messages, emails, activities, contacts, online postings, or social groups. For example, significant location subsystem 504 can determine that a location is a significant location upon determining that the user made an open table reservation at the location, upon determining that the user had made an appointment to visit the location, or upon determining that the user has purchased a ticket to enter the location.

Significant location subsystem 504 can provide the significant locations to state model engine 506. State model engine 506 can be a component of location analyzer 502 programmed to determining a state model in which significant locations are designated as states and movements between the significant locations are designated as transitions. The state model can be used to determine movement patterns of a user device or to forecast a future location of the client based on a given location and a time, regardless of whether the given location is in state or out of state. State model engine 506 can store the state model in state model database 508. State model database 508 can include a storage device on a user device or on server 102 located remotely from the user device.

System 500 can include forecasting subsystem 510 and social group analyzer 512. Forecasting subsystem 510 is a component of a user device or server 102 configured to determine a predicted future location of a user device based on the state model stored in state model database 508 and to submit the predicted location to social group analyzer 512.

Social group analyzer 512 is a component of a user device or server 102 configured to determine an ad hoc social group based on various data and to provide recommendations to a user of a user device to join the ad hoc social group. The data used in determining the social group can include significant locations provided by significant location subsystem 504, state models stored in state model database 508, and user activity data stored in activity database 514. Based on these data, social group analyzer 512 can determine a theme of the social group.

Social group analyzer 512 can provide the ad hoc social group as a recommendation through group recommendation interface 516 upon receiving a request for recommendation from a user device through group recommendation interface 516. In some implementations, social group analyzer 512 can provide the recommendation based on a predicted location of a user device. The predicted location can be provided by forecasting subsystem 510. In some implementations, upon creating a social group, social group analyzer 512 can post the social group on social group server 518. Social group server can be a system that is a part of server 102 or a server outside of server 102 configured to host one or more social groups. Social group analyzer 512 can provide information relevant to the social group (e.g., weather report for a cyclist group, traffic information for a ride-sharing group, or restaurant ratings for a dining group) to the social group server for associating with the social group.

Figure 6:
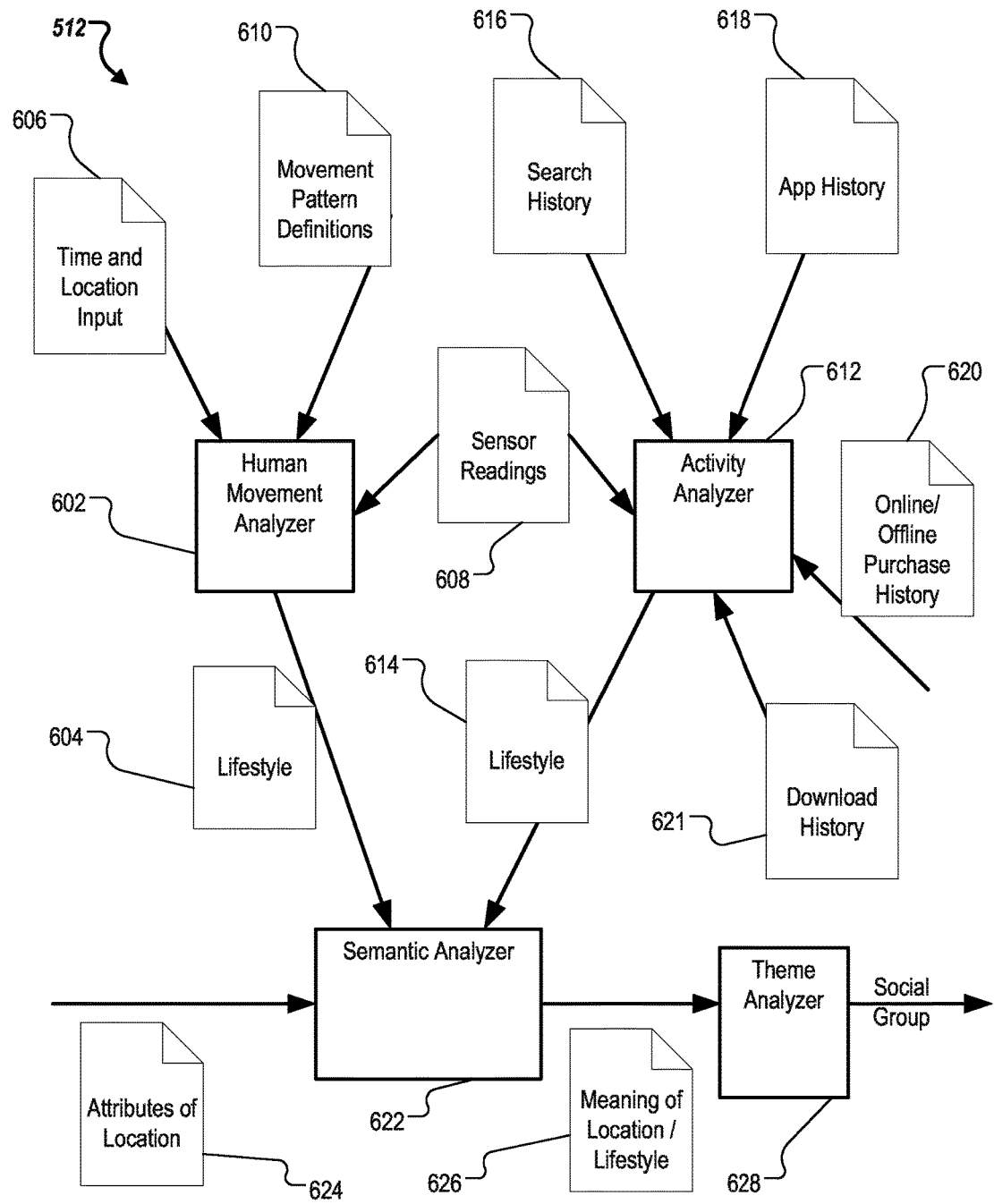
FIG. 6 is a block diagram illustrating an exemplary structure of a social group analyzer configured to determine an ad hoc social group.

FIG. 6 is a block diagram illustrating an exemplary structure of a social group analyzer configured to determine an ad hoc social group. The exemplary social group analyzer can be social group analyzer 512 of FIG. 5. Each component of social group analyzer 512 includes hardware and software (or firmware) components. Social group analyzer 512 can be implemented on a user device or server 102.

Social group analyzer 512 can include human movement analyzer 602. Human movement analyzer 602 is a component of social group analyzer 512 configured to receive input data and determine, based on the input data, lifestyle 604. Lifestyle 604 can include one or more actions a user or a group of users perform, or one or more locations the user or the group of users visit, with regularity (e.g., daily, weekly, or monthly). Lifestyle 604 may or may not be associated with users or user devices.

The input data used by human movement analyzer 602 can include time and location input 606 and sensor readings 608. Time and location input 606 can include significant locations as described above and timestamps associated with the significant locations, and optionally, a state model of movements. Sensor readings 608 can include data provided by one or more sensors of a mobile device. The input data can include movement pattern definitions 610, which define types of movements. For example, movement pattern definitions 610 can specify that, with a given likelihood, a speed of X miles per hour corresponds to a pedestrian pattern, a speed of Y miles per hour corresponds to a cyclist pattern, and a speed of Z miles per hour corresponds to a motorist pattern.

Social group analyzer 512 can include activity analyzer 612. Activity analyzer 612 is a component of social group analyzer 512 configured to receive user activity data and determine, based on the user activity data, lifestyle 614. The user activity data can include sensor readings 608 as described above. The user activity data can include search history 616, which can include a history of search terms provided by a user, search results (e.g., links and web page snippets) returned by a search engine, and search results accessed by the user (e.g., a web page returned by a search engine that was viewed). The user activity data can include application history 618, which can include a history of downloading applications and executing the applications. The user activity data can include online and offline purchase history 620, which can include online store visits, items purchased, and frequency of purchase. The user activity data can include download history 621, which can include history of content (e.g., digital images, music, and video) downloaded or streamed to a user device.

Social group analyzer 512 can include semantic analyzer 622. Semantic analyzer is a component of social group analyzer 512 configured to receive input including lifestyles 604 and 614, and location attributions 624, and to determine output 626 that includes a meaning of a location or a lifestyle of a group of users associated with a location. The location attributes 624 can include data from a map database associating location features with geographic locations. The location features can include businesses (e.g., a bicycle shop), landmarks (e.g., a bike trail), or crowd-sourced point-of-interest locations (e.g., paragliding launch sites). Semantic analyzer 622 can determine a meaning of a location or a lifestyle by cross-mapping location attributes 624, lifestyle 604 based on movement patterns, and lifestyle 614 based on user activities. A single location can be associated with multiple meanings or lifestyles.

Semantic analyzer 622 can provide output 626 to theme analyzer 628. Theme analyzer 628 is a component of social group analyzer 512 configured to determine, based on a number of users that are compatible with the meaning of lifestyle, where the number satisfies a pre-specified or user-defined threshold (e.g., N users), that an ad hoc social group can be created. Theme analyzer 628 can create the social group, and determine a theme of the social group based on meaning or lifestyle 626 received from semantic analyzer 622.

Exemplary Procedures

Figure 7:
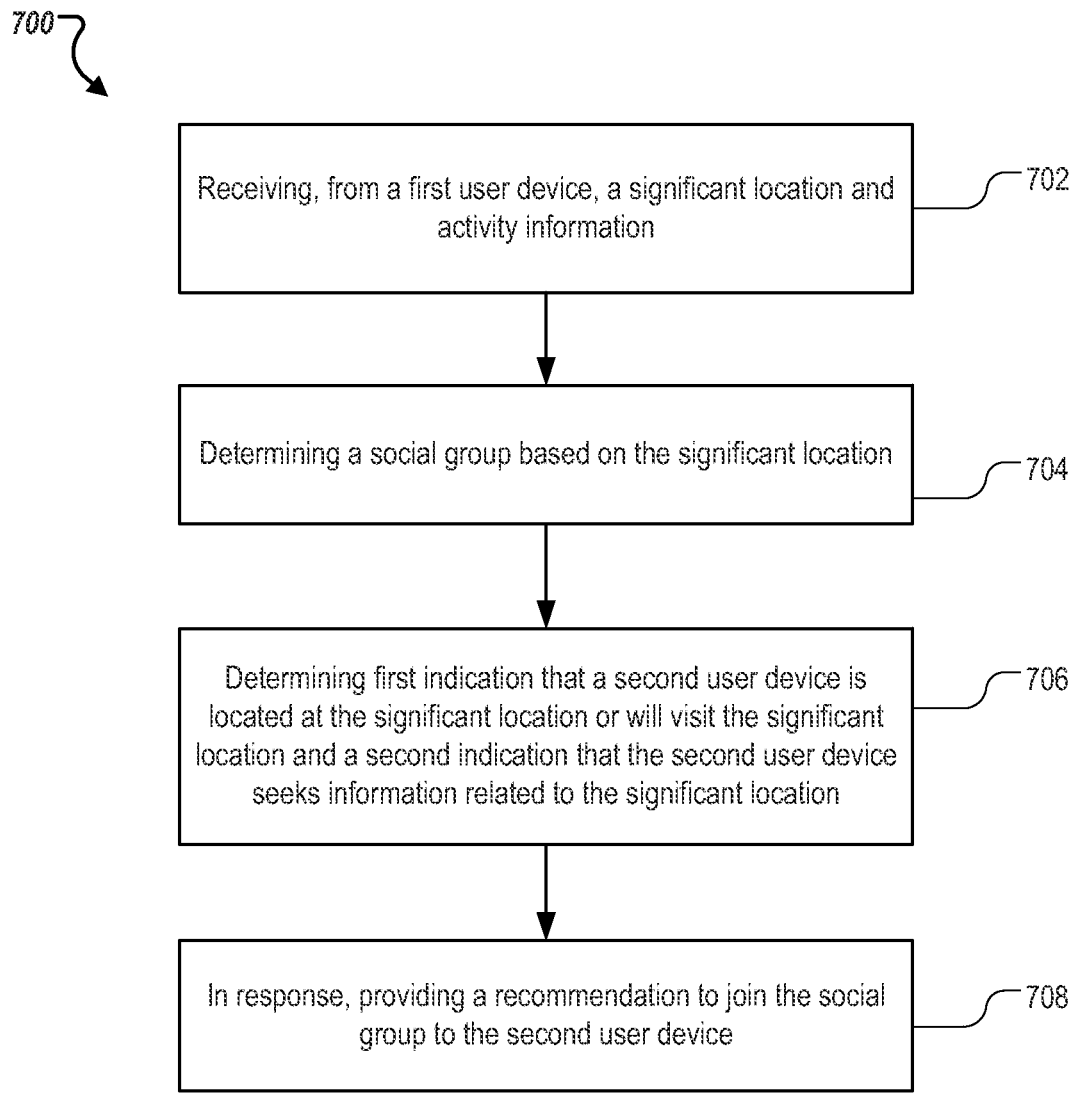
FIG. 7 is a flowchart illustrating an exemplary procedure of determining an ad hoc social group based on lifestyle.

FIG. 7 is a flowchart illustrating exemplary procedure 700 of determining an ad hoc social group based on lifestyle. Procedure 700 can be performed by a system, e.g., system 500 of FIG. 5, that includes one or more computers.

The system can receive (702), from a first user device, a significant location and activity information. The significant location can be a location where the first user device has stayed for at least a threshold amount of time. The activity information can include information usable for determining a type of activities that a user of the first user device performed at the significant location. The activity information can include sensor readings of the first user device indicative of movement of the first user device. The activity information can include a history of content access that occurred on the first user device at the significant location. The activity information can include a history of application program launching that occurred on the first user device at the significant location.

The system can determine (704) a social group based on the significant location. The social group can be an ad hoc group including anonymous participants. The social group can be created by the system without being initiated by the user. The social group can be based on a significant location. The system can recommend the social group to a user upon detecting that the user entered the significant location, or remove a user from the social group upon determining that the user has left the significant location.

Determining the social group can include determining a theme of the social group based on the activity information and designating the user as an anonymous member of the social group. In some implementations, determining the theme of the social group can include determining a meaning of the significant location based on a pattern of the first device visiting the significant location and one or more rules corresponding to patterns of human behavior. The system can then determine the theme based on the meaning and the activity information. In some implementations, determining the theme of the social group can include determining a lifestyle of one or more users based on the activity information and the significant location. The lifestyle can include a movement pattern. The system can then determine the theme based on the significant location and the lifestyle. In some implementations, determining the theme can include determining web content or application programs to be associated with the social group based on the activity information.

The system can determine (706) a first indication that a second user device is located at the significant location or will visit the significant location and a second indication that the second user device seeks information related to the significant location. The second indication can be a request from the second user device for searching social groups related to the theme, or a request from the second user device for information related to the significant location.

Determining the first indication that the second user device is located at the significant location or will visit the significant location can include receiving, from the second user device, the first indication that the second user device is located at the significant location for at least the threshold amount of time. Determining the first indication that the second user device is located at the significant location or will visit the significant location can include receiving, from the second user device, a current location of the second user device and predicting that the second user device will visit the significant location based on the current location, a future time, and a state model representing past movements of the second user device.

In response to determining the first indication and second indication, the system can provide (708) a recommendation to join the social group to the second user device. In some implementations, the system can provide a count of user devices that are located at the significant location and that have joined the social group as a membership count to be associated with the recommendation. In some implementations, the system can determine that the second user device is an infrequent visitor of the significant location. In response, the system can provide a selection recommendation for joining the social group and a second social group. The social group can be designated as a social group of residents local to the significant location. The second social group can be designated as a social group of visitors foreign to the significant location.

Exemplary Mobile Device Architecture

Figure 8:
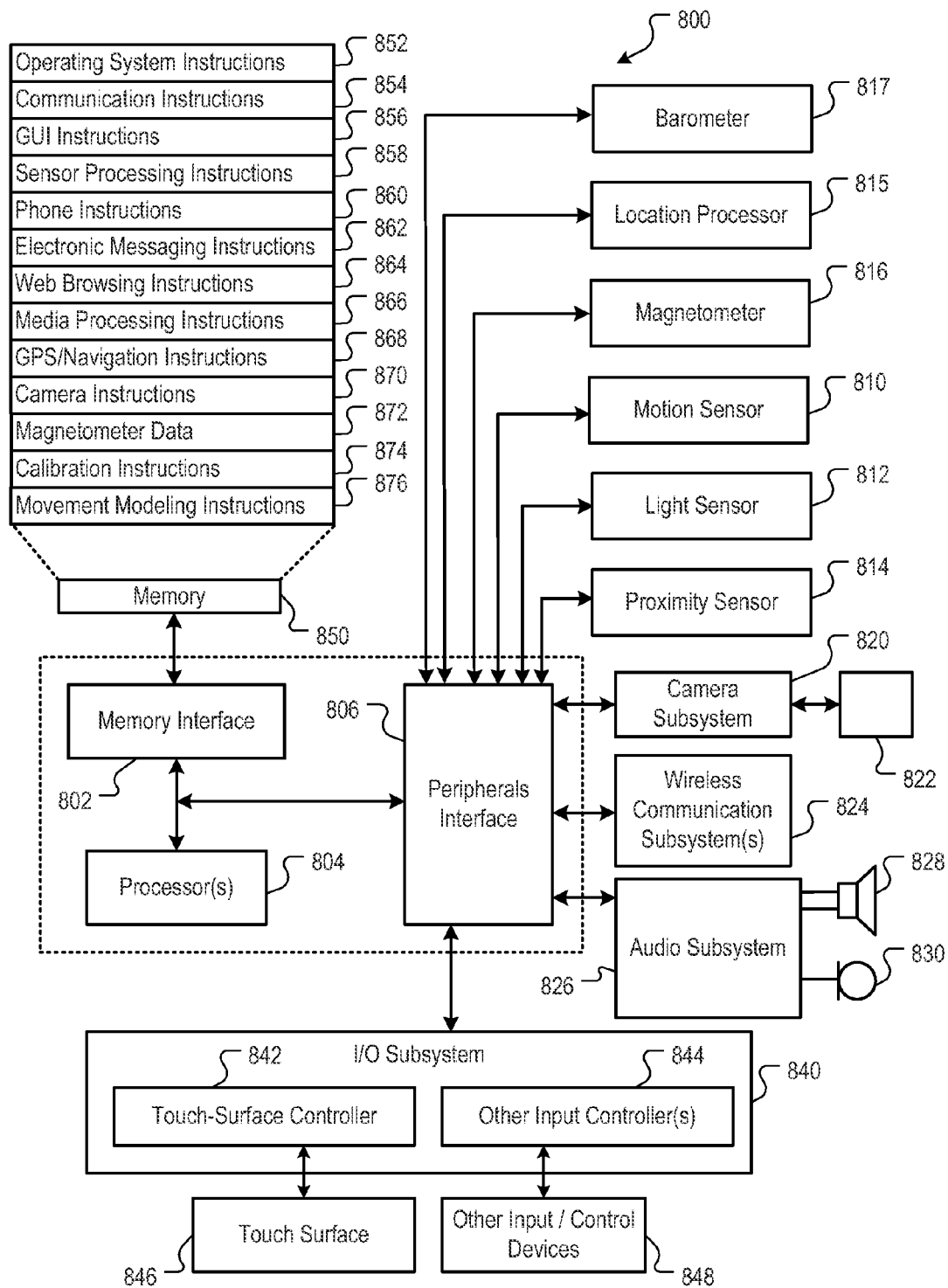
FIG. 8 is a block diagram illustrating an exemplary device architecture of a mobile device implementing the features and operations of FIGS. 1-7.

FIG. 8 is a block diagram illustrating exemplary device architecture 800 of a mobile device implementing the features and operations of FIGS. 1-7. A mobile device (e.g., a user device as described in reference to FIGS. 1-7) can include memory interface 802, one or more data processors, image processors and/or processors 804, and peripherals interface 806. Memory interface 802, one or more processors 804 and/or peripherals interface 806 can be separate components or can be integrated in one or more integrated circuits. Processors 804 can include application processors, baseband processors, and wireless processors. The various components in the mobile device, for example, can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. Location processor 815 (e.g., GPS receiver) can be connected to peripherals interface 806 to provide geopositioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Motion sensor 810 can include one or more accelerometers configured to determine change of speed and direction of movement of the mobile device. Barometer 817 can include one or more devices connected to peripherals interface 806 and configured to measure pressure of atmosphere around the mobile device.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a mobile device is intended to operate. For example, a mobile device can include communication subsystems 824 designed to operate over a GSM network, a GPRS network, an EDGE network, a Wi-Fi™ or WiMAX™ network, and a Bluetooth™ network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording, and telephony functions. Audio subsystem 826 can be configured to receive voice commands from the user.

I/O subsystem 840 can include touch surface controller 842 and/or other input controller(s) 844. Touch surface controller 842 can be coupled to a touch surface 846 or pad. Touch surface 846 and touch surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 846. Touch surface 846 can include, for example, a touch screen.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In one implementation, a pressing of the button for a first duration may disengage a lock of the touch surface 846; and a pressing of the button for a second duration that is longer than the first duration may turn power to the mobile device on or off. The user may be able to customize a functionality of one or more of the buttons. The touch surface 846 can, for example, also be used to implement virtual or soft buttons and/or a keyboard.

In some implementations, a mobile device can present recorded audio and/or video files, such as MP3, AAC, and MPEG files. In some implementations, the mobile device can include the functionality of an MP3 player. The mobile device may, therefore, include a pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store operating system 852, such as Darwin, RTXC, LINUX, UNIX, OS X, WINDOWS, iOS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; magnetometer data 872 and calibration instructions 874 to facilitate magnetometer calibration. The memory 850 may also store other software instructions (not shown), such as security instructions, web video instructions to facilitate web video-related processes and functions, and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 850. Memory 850 can store movement modeling instructions 876. Movement modeling instructions 876, upon execution, can cause processor 804 to perform the operations of location analyzer 502 (of FIG. 5).

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Exemplary Operating Environment

Figure 9:
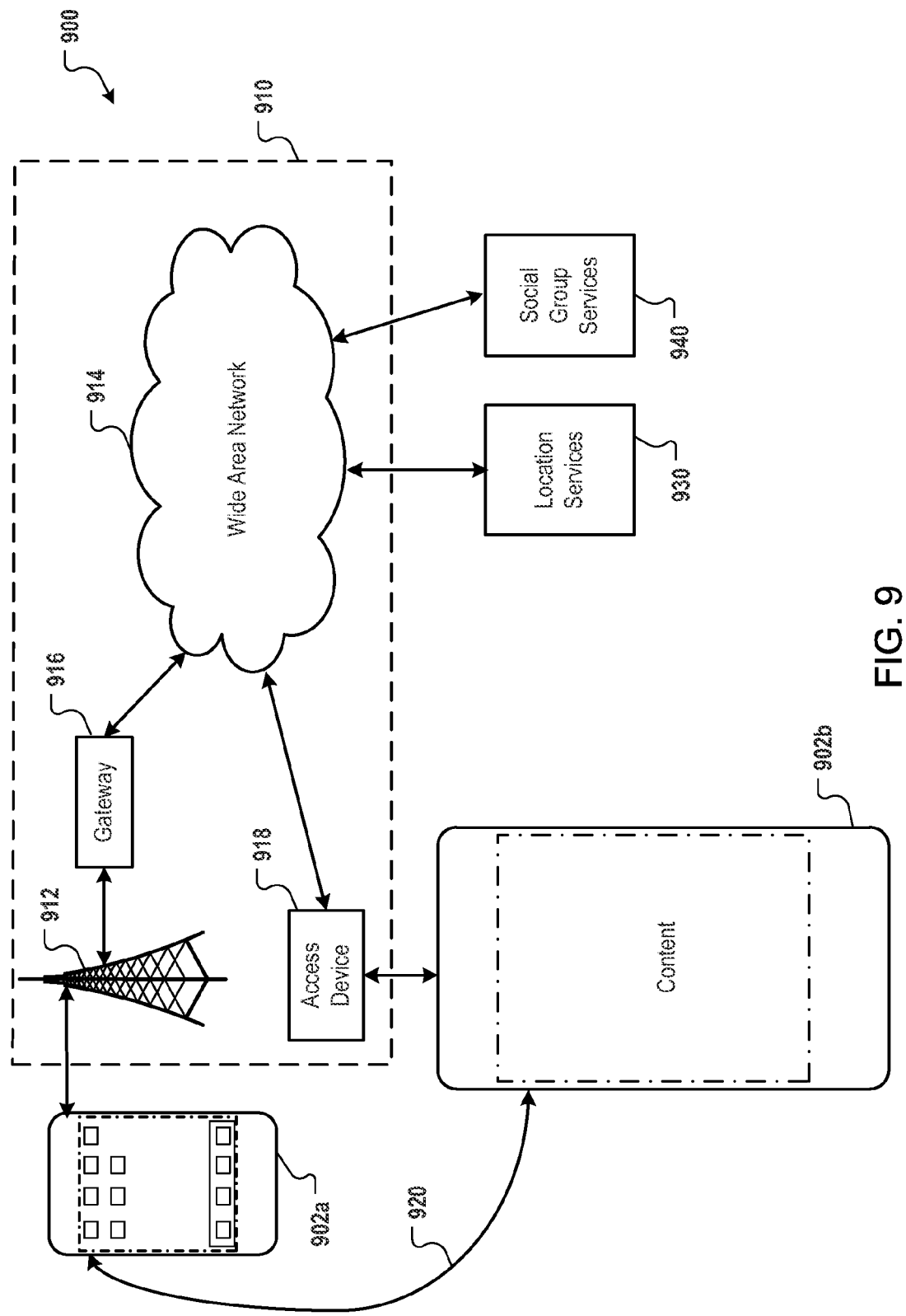
FIG. 9 is a block diagram of an exemplary network operating environment for the mobile devices implementing the features and operations of FIGS. 1-7.

FIG. 9 is a block diagram of exemplary network operating environment 900 for the mobile devices implementing the features and operations of FIGS. 1-7. Mobile devices 902a and 902b can, for example, communicate over one or more wired and/or wireless networks 910 in data communication. For example, a wireless network 912, e.g., a cellular network, can communicate with a wide area network (WAN) 914, such as the Internet, by use of a gateway 916. Likewise, an access device 918, such as an 802.11g wireless access point, can provide communication access to the wide area network 914. Each of mobile devices 902a and 902b can be a user device as described in FIGS. 1-7.

In some implementations, both voice and data communications can be established over wireless network 912 and the access device 918. For example, mobile device 902a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 912, gateway 916, and wide area network 914 (e.g., using Transmission Control Protocol/Internet Protocol (TCP/IP) or User Datagram Protocol (UDP)). Likewise, in some implementations, the mobile device 902b can place and receive phone calls, send and receive e-mail messages, and retrieve electronic documents over the access device 918 and the wide area network 914. In some implementations, mobile device 902a or 902b can be physically connected to the access device 918 using one or more cables and the access device 918 can be a personal computer. In this configuration, mobile device 902a or 902b can be referred to as a "tethered" device.

Mobile devices 902a and 902b can also establish communications by other means. For example, wireless device 902a can communicate with other wireless devices, e.g., other mobile devices, cell phones, etc., over the wireless network 912. Likewise, mobile devices 902a and 902b can establish peer-to-peer communications 920, e.g., a personal area network, by use of one or more communication subsystems, such as the Bluetooth™ communication devices. Other communication protocols and topologies can also be implemented.

Mobile device 902a or 902b can, for example, communicate with one or more services 930 and 940 over the one or more wired and/or wireless networks. For example, one or more location services 930 can provide location data associated with cellular towers or wireless access gateways to mobile devices 902a and 902b such that mobile device 902a and 902b can determine a current location using triangulation. Social group services 940 can provide ad hoc social group information to a user based on a current location of the user and a movement pattern of the user.

Mobile device 902a or 902b can also access other data and content over the one or more wired and/or wireless networks. For example, content publishers, such as news sites, Really Simple Syndication (RSS) feeds, web sites, blogs, social networking sites, developer networks, etc., can be accessed by mobile device 902a or 902b. Such access can be provided by invocation of a web browsing function or application (e.g., a browser) in response to a user touching, for example, a Web object.

As described above, some aspects of the subject matter of this specification include gathering and use of data available from various sources to improve services a mobile device can provide to a user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Exemplary System Architecture

Figure 10:
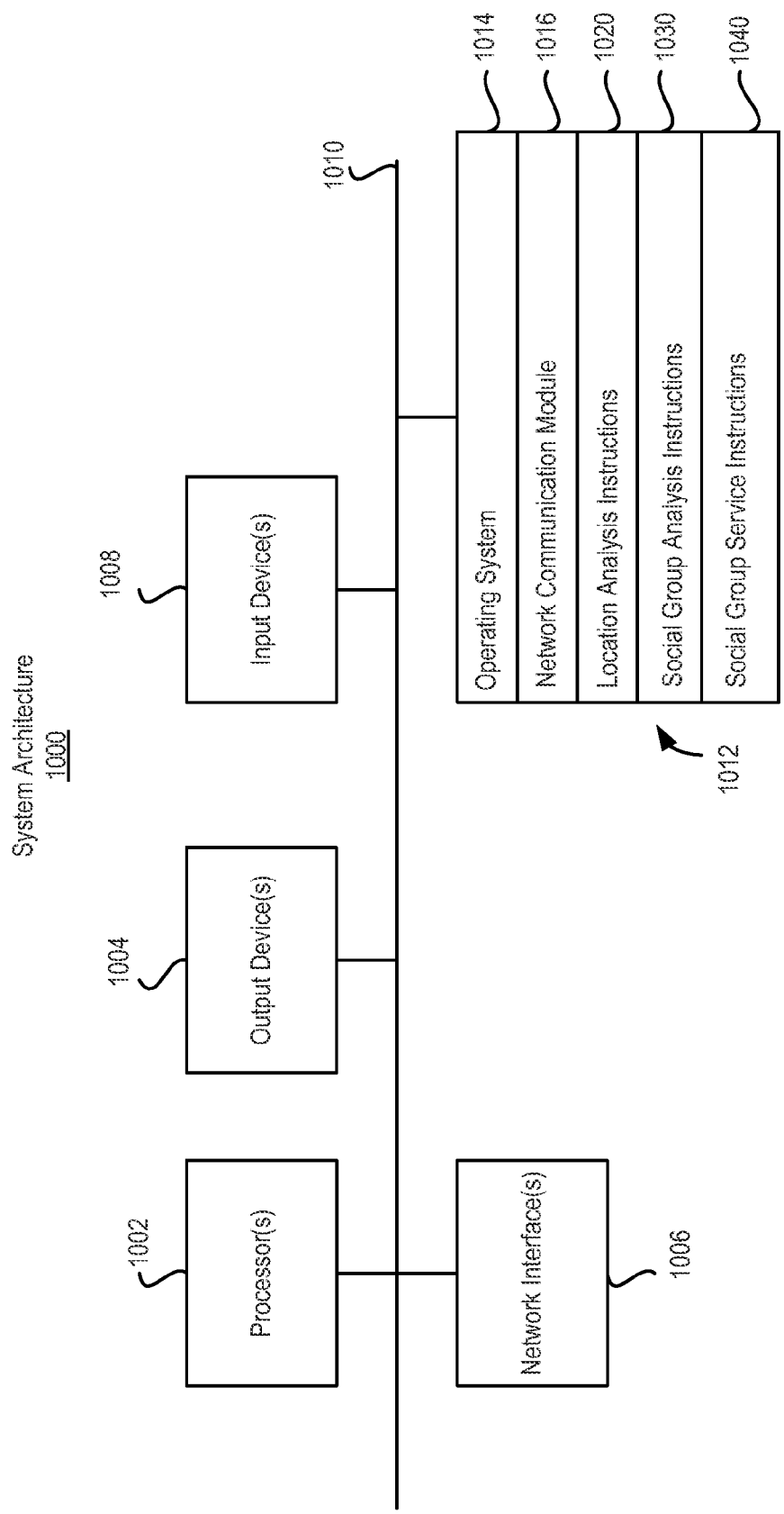
FIG. 10 is a block diagram of an exemplary system architecture for implementing the features and operations of FIGS. 1-7

FIG. 10 is a block diagram of exemplary system architecture 1000 for implementing the features and operations of FIGS. 1-7. Other architectures are possible, including architectures with more or fewer components. System architecture 1000 can be implemented by server 102 of FIG. 1. In some implementations, architecture 1000 includes one or more processors 1002 (e.g., dual-core Intel® Xeon® Processors), one or more output devices 1004 (e.g., LCD), one or more network interfaces 1006, one or more input devices 1008 (e.g., mouse, keyboard, touch-sensitive display) and one or more computer-readable mediums 1012 (e.g., RAM, ROM, SDRAM, hard disk, optical disk, flash memory, etc.). These components can exchange communications and data over one or more communication channels 1010 (e.g., buses), which can utilize various hardware and software for facilitating the transfer of data and control signals between components.

The term "computer-readable medium" refers to any medium that participates in providing instructions to processor 1002 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1012 can further include operating system 1014 (e.g., Mac OS® server, Windows Server®, or iOS®), network communication module 1016, location analysis instructions 1020, social group analysis instructions 1030, and social group service instructions 1040. Operating system 1014 can be multi-user, multiprocessing, multitasking, multithreading, real time, etc. Operating system 1014 performs basic tasks, including but not limited to: recognizing input from and providing output to devices 1006, 1008; keeping track and managing files and directories on computer-readable mediums 1012 (e.g., memory or a storage device); controlling peripheral devices; and managing traffic on the one or more communication channels 1010. Network communications module 1016 includes various components for establishing and maintaining network connections (e.g., software for implementing communication protocols, such as TCP/IP, HTTP, etc.). Location analysis instructions 1020 can include instructions that, when executed, causes processor 1002 to perform operations of location analyzer 502 as described above in reference to FIG. 5. Social group analysis instructions 1030 can include instructions that, when executed, causes processor 1002 to perform operations of social group analyzer 512 as described above in reference to FIG. 5. Social group service instructions 1040 can include instructions that, when executed, causes processor 1002 to perform operations of social group server 518 as described above in reference to FIG. 5.

Architecture 1000 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention.

What is claimed is:

1. A method comprising:
   receiving, from a first user device, activity information on an activity performed by a user of the first user device;
   receiving, from the first user device, a location where the first user device has stayed for at least a threshold amount of time;
   automatically determining, based on the activity information, a type of the activity;
   creating a social group based on the location and the type of the activity, including determining a theme of the social group based on the type of the activity;
   determining that a first condition that a second user device is located at the location or will visit the location is satisfied;
   determining that a second condition that the second user device seeks information related to the location or related to the theme of the social group is satisfied; and
   in response to determining that the first and second conditions are satisfied, providing a recommendation to join the social group to the second user device,
   wherein the method is performed by one or more computers.

2. The method of claim 1, wherein the activity information comprises:
   sensor readings of the first user device indicative of movement of the first user device;
   a history of content access that occurred on the first user device at the location; or
   a history of application program launching that occurred on the first user device at the location.

3. The method of claim 1, wherein the social group is an ad hoc group including anonymous participants, the social group being created by the one or more computers without being initiated by the user.

4. The method of claim 1, comprising removing a user of the second user device from the social group upon determining that the second user device has left the location.

5. The method of claim 1, wherein determining the theme of the social group comprises:
   determining a meaning of the location based on a pattern of the first device visiting the location and one or more rules corresponding to patterns of human behavior; and
   determining the theme based on the meaning and the activity information.

6. The method of claim 1, wherein determining the theme of the social group comprises:
   determining a lifestyle of one or more users based on the activity information and the location, the lifestyle including a movement pattern; and
   determining the theme based on the location and the lifestyle.

7. The method of claim 1, wherein determining the theme comprises determining web content or application programs to be associated with the social group based on the type of the activity.

8. The method of claim 1, wherein determining that the first condition is satisfied comprises:
   receiving, from the second user device, an indication that the second user device is located at the location for at least the threshold amount of time; or
   receiving, from the second user device, a current location of the second user device and predicting that the second user device will visit the location based on the current location, a future time, and a state model representing past movements of the second user device.

9. The method of claim 1, comprising providing a count of user devices that are located at the location and that have joined the social group as a membership count to be associated with the recommendation.

10. The method of claim 1, comprising:
    determining that the second user device is an infrequent visitor of the location; and
    in response, providing a selection recommendation for joining the social group and a second social group, wherein the social group is designated as a social group of residents local to the location and the second social group is designated as a social group of visitors foreign to the location.

11. A system comprising:
    one or more computing devices; and
    at least one non-transitory storage device storing instructions operable to cause the one or more computing devices to perform operations comprising:
       receiving, from a first user device, activity information on an activity performed by a user of the first user device;
       receiving, from the first user device, a location where the first user device has stayed for at least a threshold amount of time;

automatically determining, based on the activity information, a type of the activity;

creating a social group based on the location and the type of the activity, including determining a theme of the social group based on the type of the activity;

determining that a first condition that a second user device is located at the location or will visit the location is satisfied;

determining that a second condition that the second user device seeks information related to the location or related to the theme of the social group is satisfied; and in response to determining that the first and second conditions are satisfied, providing a recommendation to join the social group to the second user device.

12. The system of claim 11, wherein the activity information comprises:

sensor readings of the first user device indicative of movement of the first user device;

a history of content access that occurred on the first user device at the location; or a history of application program launching that occurred on the first user device at the location.

13. The system of claim 11, wherein the social group is an ad hoc group including anonymous participants, the social group being created by the one or more computers without being initiated by the user.

14. The system of claim 11, the operations comprising removing a user of the second user device from the social group upon determining that the second user device has left the location.

15. The system of claim 11, wherein determining the theme of the social group comprises:

determining a meaning of the location based on a pattern of the first device visiting the location and one or more rules corresponding to patterns of human behavior; and determining the theme based on the meaning and the activity information.

16. The system of claim 11, wherein determining the theme of the social group comprises:

determining a lifestyle of one or more users based on the activity information and the location, the lifestyle including a movement pattern; and determining the theme based on the location and the lifestyle.

17. The system of claim 11, wherein determining the theme comprises determining web content or application programs to be associated with the social group based on the type of the activity.

18. The system of claim 11, wherein determining that the first condition is satisfied comprises:

receiving, from the second user device, an indication that the second user device is located at the location for at least the threshold amount of time; or receiving, from the second user device, a current location of the second user device and predicting that the second user device will visit the location based on the current location, a future time, and a state model representing past movements of the second user device.

19. The system of claim 11, the operations comprising providing a count of user devices that are located at the location and that have joined the social group as a membership count to be associated with the recommendation.

20. The system of claim 11, the operations comprising:

determining that the second user device is an infrequent visitor of the location; and in response, providing a selection recommendation for joining the social group and a second social group, wherein the social group is designated as a social group of residents local to the location and the second social group is designated as a social group of visitors foreign to the location.

21. At least one non-transitory storage device storing instructions operable to cause one or more computing devices to perform operations comprising:

receiving, from a first user device, activity information on an activity performed by a user of the first user device;

receiving, from the first user device, a location where the first user device has stayed for at least a threshold amount of time;

determining a type of the activity;

creating a social group based on the location and the type of the activity, including determining a theme of the social group based on the type of the activity;

determining that a first condition that a second user device is located at the location or will visit the location is satisfied;

determining that a second condition that the second user device seeks information related to the location or related to the theme of the social group is satisfied; and in response to determining that the first and second conditions are satisfied, providing a recommendation to join the social group to the second user device.

22. The non-transitory storage device of claim 21, wherein the activity information comprises:

sensor readings of the first user device indicative of movement of the first user device;

a history of content access that occurred on the first user device at the location; or a history of application program launching that occurred on the first user device at the location.

23. The non-transitory storage device of claim 21, wherein the social group is an ad hoc group including anonymous participants, the social group being created by the one or more computers without being initiated by the user.

24. The non-transitory storage device of claim 21, the operations comprising removing a user of the second user device from the social group upon determining that the second user device has left the location.

25. The non-transitory storage device of claim 21, wherein determining the theme of the social group comprises:

determining a meaning of the location based on a pattern of the first device visiting the location and one or more rules corresponding to patterns of human behavior; and determining the theme based on the meaning and the type of the activity.

26. The non-transitory storage device of claim 21, wherein determining the theme of the social group comprises:

determining a lifestyle of one or more users based on the activity information and the location, the lifestyle including a movement pattern; and determining the theme based on the location and the lifestyle.

27. The non-transitory storage device of claim 21, wherein determining the theme comprises determining web content or application programs to be associated with the social group based on the activity information.

28. The non-transitory storage device of claim 21, wherein determining that the first condition is satisfied comprises:

receiving, from the second user device, an indication that the second user device is located at the location for at least the threshold amount of time; or receiving, from the second user device, a current location of the second user device and predicting that the second user device will visit the location based on the current location, a future time, and a state model representing past movements of the second user device.

29. The non-transitory storage device of claim 21, the operations comprising providing a count of user devices that are located at the location and that have joined the social group as a membership count to be associated with the recommendation.

30. The non-transitory storage device of claim 21, the operations comprising:

determining that the second user device is an infrequent visitor of the location; and in response, providing a selection recommendation for joining the social group and a second social group, wherein the social group is designated as a social group of residents local to the location and the second social group is designated as a social group of visitors foreign to the location.

\* \* \* \* \*